United States Patent
Evans

(10) Patent No.: US 9,957,835 B2
(45) Date of Patent: May 1, 2018

(54) FAN TRACK LINER ASSEMBLY

(71) Applicant: ROLLS-ROYCE PLC, London (GB)

(72) Inventor: Dale Edward Evans, Derby (GB)

(73) Assignee: ROLLS-ROYCE plc, London (GB)

( * ) Notice: Subject to any disclaimer, the term of this patent is extended or adjusted under 35 U.S.C. 154(b) by 294 days.

(21) Appl. No.: 14/846,323

(22) Filed: Sep. 4, 2015

(65) Prior Publication Data
US 2016/0097299 A1   Apr. 7, 2016

(30) Foreign Application Priority Data

Oct. 2, 2014 (GB) .................................. 1417415.5

(51) Int. Cl.
*F01D 21/04* (2006.01)
*F01D 25/24* (2006.01)

(52) U.S. Cl.
CPC ........... *F01D 21/045* (2013.01); *F01D 25/24* (2013.01); *F01D 25/246* (2013.01); *F05D 2220/36* (2013.01); *F05D 2230/60* (2013.01); *Y02T 50/672* (2013.01)

(58) Field of Classification Search
CPC ...... F01D 21/045; F01D 25/24; F01D 25/246; F05D 2230/60
USPC ............................................................ 415/9
See application file for complete search history.

(56) References Cited

U.S. PATENT DOCUMENTS

| 7,445,421 B2 * | 11/2008 | Sathianathan ........ F01D 21/045 415/200 |
| 2010/0101205 A1 | 4/2010 | Weyland et al. |
| 2015/0128613 A1 * | 5/2015 | Fukuda .................... F02C 3/04 60/805 |
| 2016/0273550 A1 * | 9/2016 | Clarkson ............... F01D 21/045 |

FOREIGN PATENT DOCUMENTS

| EP | 0626502 A1 | 11/1994 |
| EP | 2 620 654 A1 | 7/2013 |

OTHER PUBLICATIONS

Mar. 8, 2016 extended European Search Report issued in European Patent Application No. 15183903.2.
Mar. 26, 2015 Search Report issued in British Application No. 1417415.5.

* cited by examiner

*Primary Examiner* — Logan Kraft
*Assistant Examiner* — Peter T Hrubiec
(74) *Attorney, Agent, or Firm* — Oliff PLC

(57) ABSTRACT

A fan track liner assembly for a ducted fan engine which provides for ease of installation and replacement. The assembly includes a plurality of panels; and a plurality of fastening members which are arranged to secure the panels to the fan case of the engine, wherein: each fastening member has a base portion and an elongate arm member, and further wherein: the base portion has an attachment portion which is used to secure the fastening member to the fan case; and the arm member extends from the base portion, and each panel has slotted edge portions on opposing edges at one end (Continued)

of the panel which are each arranged to engage with respective arm members of fastening members on either side of the panel when the panel is assembled with the fastening members by sliding the panel onto the fastening members or vice-versa.

14 Claims, 5 Drawing Sheets

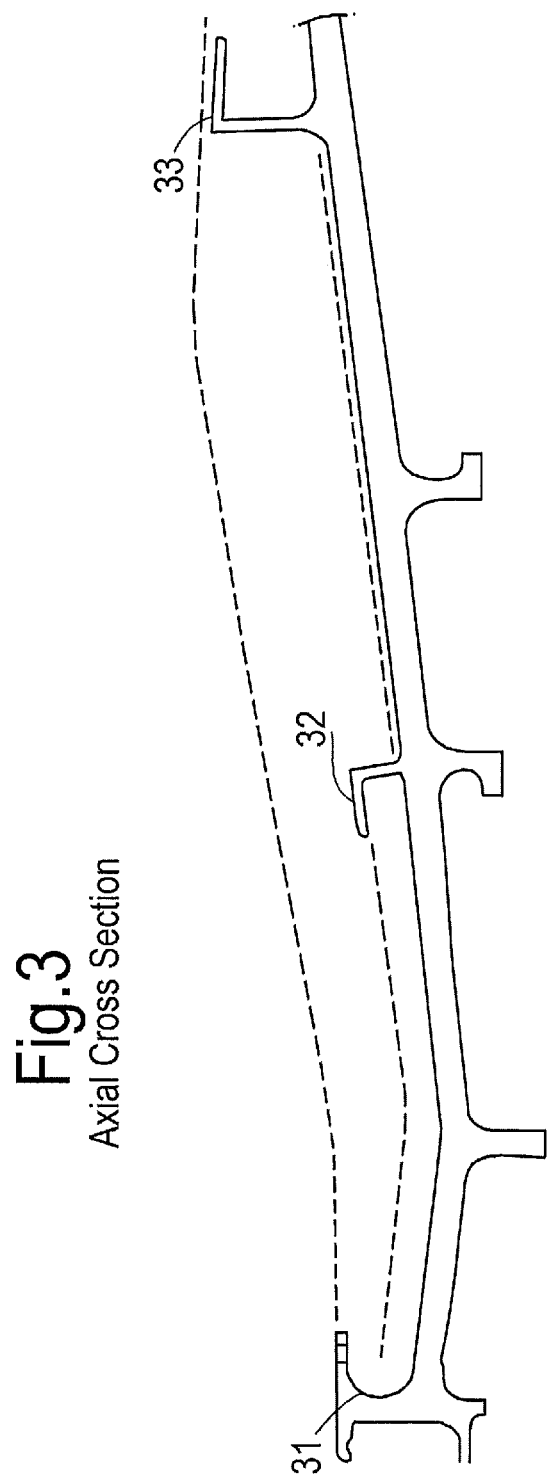

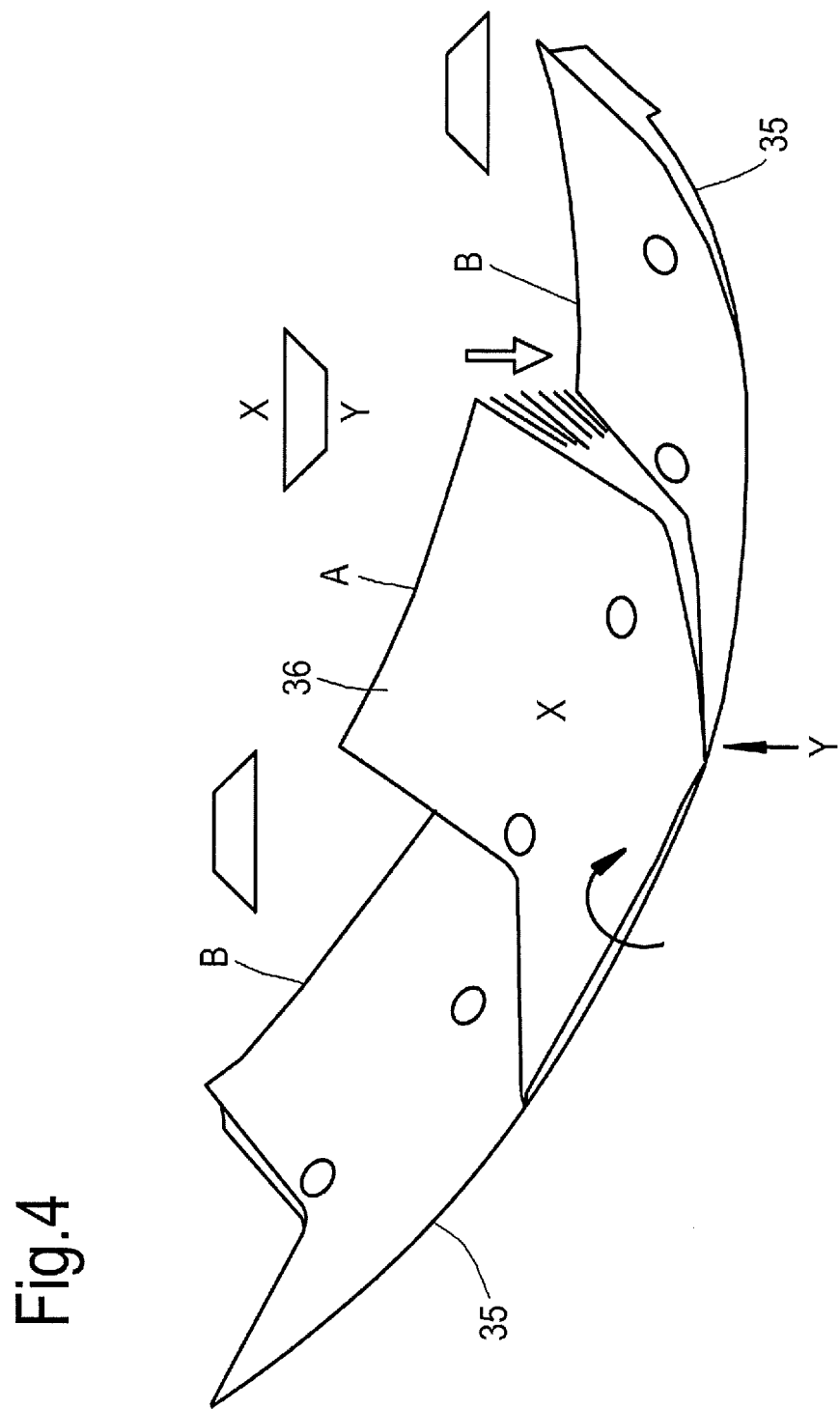

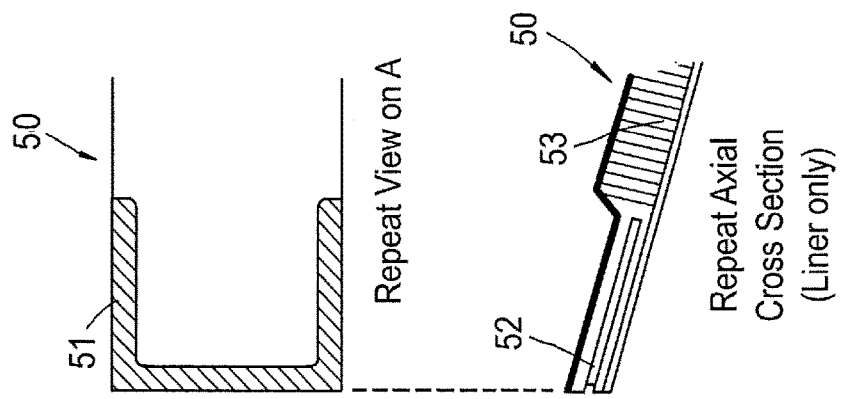
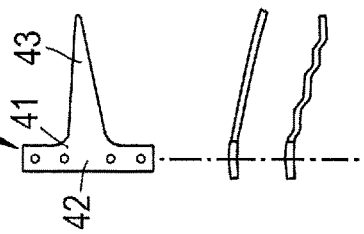
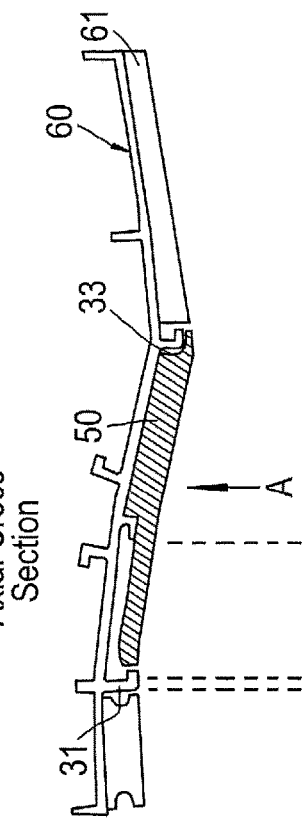
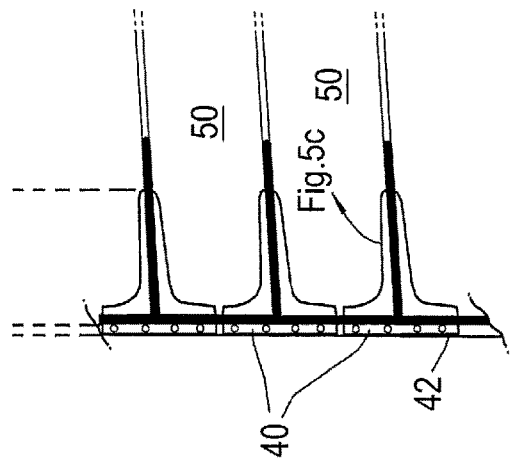

FAN TRACK LINER ASSEMBLY

FIELD OF THE INVENTION

The present invention relates to an assembly for a fan track liner for a fan engine. It is particularly, but not exclusively, concerned with an assembly for a fan track liner to be used in ducted fan gas turbine engines.

BACKGROUND OF THE INVENTION

Turbofan gas turbine engines for powering aircraft generally comprise inter alia a core engine, which drives a fan. The fan comprises a number of radially extending fan blades mounted on a fan rotor which is enclosed by a generally cylindrical fan casing.

To satisfy regulatory requirements, such engines are required to demonstrate that if part or all of a fan blade were to become detached from the remainder of the fan, that the detached parts are suitably captured within the engine containment system.

It is known to provide the fan casing with a fan track liner which together incorporate a containment system, designed to contain any released blades or associated debris. FIG. 1 shows a partial cross-section of such a casing and fan track liner.

In the event of a "fan blade off" (FBO) event, the detached fan blade 18 travels radially outward and forwards. In doing so, it penetrates the attrition liner 110. It may also penetrate the septum 112 and aluminium honeycomb layer 114 before engaging the hook 118. The fan track liner must therefore be relatively weak in order that any released blade or fragment thereof can pass through it essentially unimpeded and subsequently be trapped by the fan casing.

In addition to providing blade containment system, the fan track liner includes an annular layer of abradable material which surrounds the fan blades. During operation of the engine, the fan blades rotate freely within the fan track liner. At their maximum extension of movement and/or creep, or during an extreme event, the blades may cut a path into this abradable layer creating a seal against the fan casing and minimising air leakage around the blade tips.

The fan track liner must also be resistant to ice impact loads. A rearward portion of the fan track liner is conventionally provided with an annular ice impact panel. This is typically a glass-reinforced plastic (GRP) moulding which may also be wrapped with GRP to increase its impact strength, or simply higher density honeycomb and tougher attrition material defining an ice impact zone. Ice which forms on the fan blades is acted on by both centrifugal and airflow forces, which respectively cause it to move outwards and rearwards before being shed from the blades.

The geometry of a conventional fan blade is such that the ice is shed from the trailing edge of the blade, strikes the ice impact panel and is deflected without damaging the panel.

Swept fan blades are increasingly used in turbofan engines as they offer significant advantages in efficiency over conventional fan blades. Swept fan blades have a greater chord length at their central portion than conventional fan blades. This greater chordal length means that ice that forms on a swept fan blade follows the same rearward and outward path as on a conventional fan blade but may reach the radially outer tip of the blade before it reaches the trailing edge. It will therefore be shed from the blade tip and may strike the fan track liner forward of the ice impact panel within the blade off zone.

The liner used with a swept fan blade is therefore required to be strong enough to resist ice impact whilst allowing a detached fan blade to penetrate and be contained therewithin.

In recent years there has been a trend towards the use of lighter fan blades, which are typically either of hollow metal or of composite construction. These lighter blades have a similar impact energy per unit area as an ice sheet, which makes it more difficult to devise a casing arrangement that will resist the passage of ice and yet not interfere with the trajectory of a released fan blade.

An Aluminium-Kevlar soft wall casing system is currently the preferred solution for corporate applications based upon cost and weight. This includes a fan track liner within the posting chamber that is exposed to the fan blade—allowing tighter tip clearance and rotor out of balance (OOB) orbit with a fused structure post fan blade off (FBO) similar to existing hard wall casings.

Given the presence of a liner system on a soft wall casing it is believed that the fundamental issue of swept blade penetration of a robust liner (ice impact worthy), exacerbated by part speed part fragment, post FBO is as discussed above. With a fan blisc typical of this engine sector the aerofoil projectile is even less able to penetrate.

If the aerofoil buckles and the tip breaks off before penetration or the released fragment is smaller or the released fragment occurs at part speed, it is possible, based upon test experience, that the fragment will eject forwards through the intake. The certification authorities now expect evidence that this threat has been addressed by the design.

Even if the blade is robust enough to penetrate the liner and allow the soft wall system to function as intended (a blade retained by the Kevlar band), the part speed part fragment threat remains. Therefore, there is a need for a design that allows these fragments to post into the chamber provided and be retained there even if otherwise the casing acts as a hard wall system.

SUMMARY OF THE INVENTION

At its broadest, a first aspect of the present invention provides an assembly for a fan track liner which allows the panels of the fan track liner to be assembled by slotting them over fastening members, or slotting fastening members into the panels.

Preferably a first aspect of the present invention provides an assembly for a fan track liner in a ducted fan engine, the assembly including: a plurality of panels; and a plurality of fastening members which are arranged to secure the panels to the fan case of the engine, wherein: each fastening member has a base portion and an elongate arm member, and further wherein: the base portion has attachment means which is used to secure the fastening member to the fan case; and the arm member extends from the base portion, and each panel has slotted edge portions on opposing edges at one end of the panel which are each arranged to engage with respective arm members of fastening members on either side of the panel when the panel is assembled with the fastening members by sliding the panel onto the fastening members or vice-versa.

The fan track liner assembly of this aspect allows fastening members to be attached to fan case and the fan track liner panels to be loaded, preferably from the rear, to ensure that the panels are inter-locked without adhesive. This can allow much easier in-service panel replacement.

The inter-locking and minimum length of suspended panel can also raise panel vibration frequencies above red line (highest speed of the rotor in rpm in extreme operation which defines an excitation frequency limit) whilst allowing adjacent panels to displace radially together without a step when subject to an FBO load, exposing the containment fence to the released blade fragment and restraining its axial trajectory for an acceptable containment result.

This concept improves on the prior art discussed above in addressing the requirement to ensure FBO fragment axial restraint with a robust liner construction and trapdoor feature by ensuring the panels are tied without adhesive but also without hindering ease of assembly. This addresses concerns with the effect on liner integrity, containment functionality and the requirement for in-service replacement in lieu of repair that is associated with the use of adhesives and from variable adhesive joint quality.

Optional and preferred features of the invention will now be set out. These are applicable singly or in any combination with any aspect of the invention.

Preferably the slotted edge portions are joined by a slotted end portion on the edge of the panel joining the opposing edges at said end of the panel. In this manner the slotted edge extends around one end of the panel, which may allow the edge at the end of the panel to engage with the base portion and improve the security of the engagement between the panels and fastening members and may help to improve the aerodynamic integrity of the fan track liner when assembled.

Preferably the area of the panel surrounding the slotted portions may be formed from a resilient material, such as a filled honeycomb structure or from co-moulded Lytex. This can allow for a secure connection when the arm members of the fastening members engage with the slotted portions by providing a degree of "grip" between the panels and the fastening members.

The arm members may taper to a point at the end distal from the base portion. This configuration can ease the assembly of each panel onto the fastening members. A potential further benefit to such tapering is that the required support from the fastening member may be most needed at the edge of the panel closest to the base of the fastening member (typically the front edge).

The arm members may have a wavy cross-section. This cross-section may allow the fastening members to take up any tolerance between arm member and the slotted portion of the panel.

The panel may have an engagement portion and a body portion, wherein the engagement portion includes said slotted portions, and further wherein at least the body portion has an abradable layer on one side and a honeycomb construction. The abradable layer is preferably on the surface of the panel facing the interior of the engine when assembled. This layer can be worn away by the passage of the fan blades at their maximum extension of movement and/or creep, or during an extreme event, and create a seal against the fan casing and minimising air leakage around the blade tips.

Preferably the panel has a hinged portion which operates as a trapdoor to permit a blade or blade fragment to pass through it. This trapdoor system, as described above, allows for the containment of a fan blade or fan blade fragment in an FBO event by allowing the fan blade or fragment to penetrate the panel and its momentum to be absorbed by liner material forward of the trapdoor whilst exposing the axial fence restraint.

The assembly of the present aspect may be incorporated into both existing hard wall and soft wall containment systems.

Incorporating a removable trapdoor liner system into a soft wall fan containment case addresses the issue of FBO part speed part fragment penetration with a swept fan blade or blisc aerofoil and robust liner by "posting" this fragment rather than releasing it through the intake. This "posting" may be akin to hard wall behaviour for these fragments where the Kevlar outer band is not significantly deflected.

The integration of a trapdoor liner into a soft wall fan case is facilitated by the interlocking between the fastening members and the slotted portions of the panels, and can also provide a posting chamber addressing concerns regarding containment function with a swept blade and FBO with a part speed part fragment release.

A second aspect of the present invention provides a gas turbine engine having a fan track liner which is formed of a fan track liner assembly according to the above first aspect, including some, all or none of the optional and preferred features of that aspect.

Preferably the panels of the assembled fan track liner abut around the inner circumference of the fan case of the engine.

Preferably the panel has a hinged portion which operates as a trapdoor to permit a blade or blade fragment to pass through it, and a portion of the fan track liner forward of said trapdoor has a honeycomb construction separated from the interior of the engine by a removable liner.

This configuration allows a fan blade or fan blade fragment to readily penetrate the liner during an FBO event, but be retained within the fan case as its momentum in the forward direction is absorbed by the honeycomb construction.

In some embodiments, a portion of the fan track liner rearward of said trapdoor has a honeycomb construction separated from the interior of the engine by said panel. This rearward honeycomb construction may be of a higher density than the forward honeycomb construction. The rearward honeycomb portion can therefore be made ice impact resistant.

In some embodiments, the fan track liner is made up of two panel elements: one set of panels which are secured by the fastening members and a second set which are separately secured, e.g. by bolting to the fan casing. By providing a two part in-line panel, ease of assembly and in-service replacement of the exposed abradable liner in lieu of repair can be greatly facilitated.

The two part fan track liner can also allow the fastening members to be inserted between trapdoor panels for displacement of adjacent panels without presenting a step to allow fragment passage into the posting chamber whilst aiding ease of assembly and in service replacement in lieu of repair and addressing suspended panel vibration integrity (driven by blade passing frequency).

At their broadest, methods of aspects of the present invention provide methods of assembling or replacing a fan track liner in a gas turbine engine by sliding a plurality of panels onto fastening members or inserting fastening members into grooves in the panels.

A third aspect of the present invention provides a method of assembling a fan track liner in a gas turbine engine, the fan track liner including an assembly according to the above described first aspect, including some, all or none of the optional and preferred features of that aspect, the method including the steps of: attaching the plurality of fastening members to the fan case of the engine at positions equidistant around the circumference of the interior of the fan case; and sliding the plurality of panels onto the plurality of fastening members, the plurality of panels collectively making up the interior surface of the fan track liner.

A fourth aspect of the present invention provides a method of assembling a fan track liner in a gas turbine engine, the fan track liner including an assembly according to the above described first aspect, wherein each panel has a hinged portion which operates as a trapdoor to permit a blade or blade fragment to pass through it, including some, all or none of the other optional and preferred features of that aspect, the method including the steps of: attaching said panels into place circumferentially around the interior of the fan case; positioning said fastening members by inserting the arm member of each fastening member into the groove formed by the slotted edge portions of adjacent panels; and attaching said fastening members to said fan case.

The method may further include the step of attaching further panels to the interior of the fan case forward of said fastening members.

The assembly in this manner allows the fastening members to inserted between trapdoor panels for displacement of adjacent panels without presenting a step to allow fragment passage into the posting chamber whilst aiding ease of assembly and in service replacement in lieu of repair and addressing suspended panel vibration integrity (driven by blade passing frequency).

BRIEF DESCRIPTION OF THE DRAWINGS

Embodiments of the invention will now be described by way of example with reference to the accompanying drawings in which:

FIG. 3 shows a partial cross-section through the fan casing in the area of fan track liner;

FIG. 4 shows the configuration of the trapdoor panels over a fan track liner;

FIGS. 5a-5d show a fan track liner and a fan track liner assembly according to an embodiment of the present invention.

DETAILED DESCRIPTION AND FURTHER OPTIONAL FEATURES OF THE INVENTION

Figure 1:
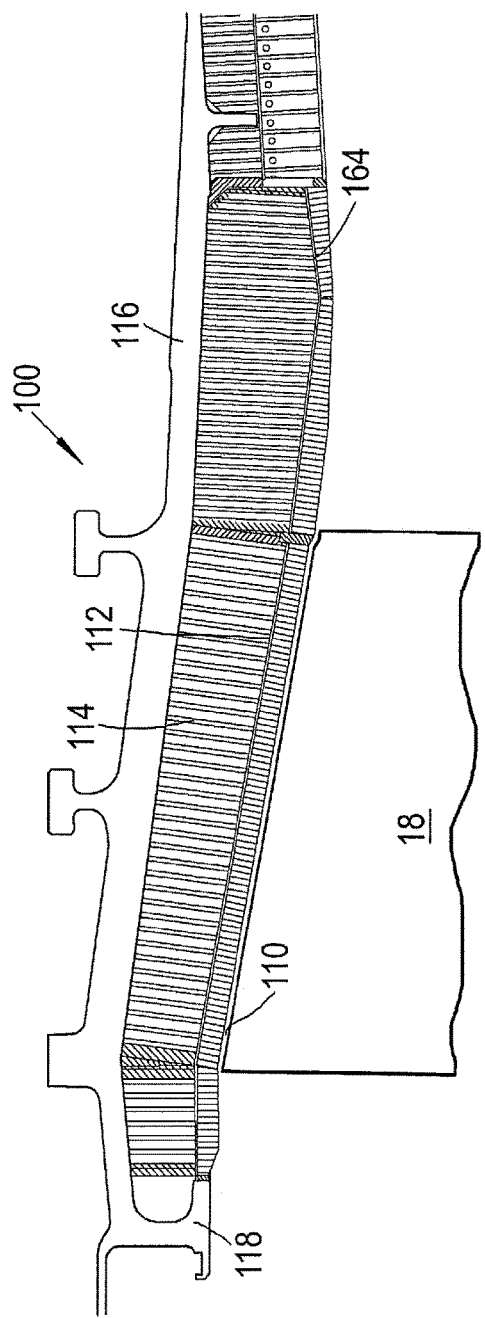
FIG. 1 shows a partial cross-section of a fan casing with a fan track liner and has already been described.
Figure 2:
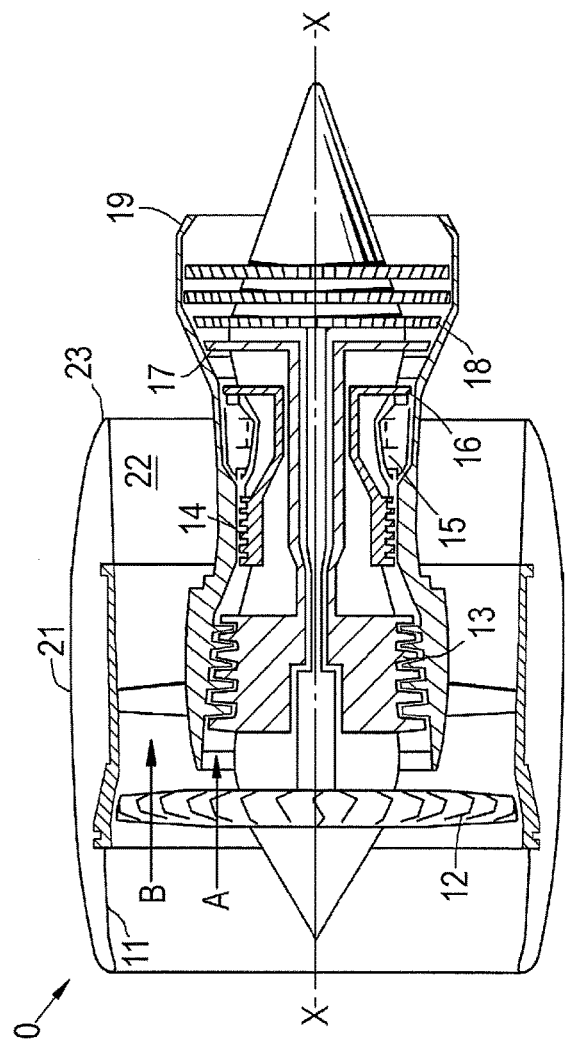
FIG. 2 shows a cross-section through a ducted fan gas turbine engine in which embodiments of the present invention are implemented.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

For the Trent XWB engine produced by Rolls-Royce, the above problems were addressed by providing a fan track liner trapdoor arrangement. The relevant details are set out in earlier patent applications filed by Rolls-Royce which were not publicly available at the date of filing of the present application, but are summarized here.

The space envelope for the honeycomb, composite sheet and filler sandwich construction and interface features for this fan track liner are shown in FIG. 3 and has three hooks which provided location surfaces for the fan track liner and trapdoor: a front hook 31, a first rear hook 32 and a second rear hook 33.

This concept then acquired a skew to the forward portion that dictates two panel standards for assembly as shown in FIG. 4: an "A" top panel 36 and a "B" bottom panel 35 which alternate around the circumference of the fan track liner.

The basic reasons for introducing a trapdoor concept have been set out above. However when a released fan blade acts on a panel to displace it radially outwards, the adjacent panel presents a step as the fan blade tip in contact with the panel rotates around the annulus. The result is that the blade tip ends up skipping over the containment fence in much the same way as the original problem, particularly passing from panel B to panel A.

Previously a trapdoor skew was selected which analytically solved the problem until assembly requirements introduced alternating panel interface chamfers (27.5 degrees)—the B-A interface didn't work without an adhesive bond and for vibration the extra length presented by the skewed portion resulted in panel vibration issues without an adhesive bond for both interfaces.

Use of an adhesive bond presents issues for both assembly and on-wing repair. The purpose of a cassette fan track liner is to allow airlines to address liner damage quickly and effectively on-wing with minimum disruption. The presence of adhesive undermines this concept both in terms of cure time and bond quality control. It is therefore desirable to provide the benefit of a bolted cassette liner assembly again, allowing a panel tiling effect to avoid inter-panel steps subject to FBO load whilst providing a means of avoiding panel edge vibration.

A fan track liner assembly according to an embodiment of the present invention is shown in FIGS. 5a-5e. FIG. 5a shows an axial part cross-section of a fan case of a gas turbine engine such as that shown in FIG. 4. FIG. 5b shows the view from the direction indicated by A in FIG. 5a looking outwards from the interior of the fan case. FIG. 5c shows the detail of a location tang 40 shown in FIG. 5b in both plan view and cross section. FIG. 5d shows the detail of a fan track liner panel 50 shown in FIGS. 5a and 5b in both plan view and cross section.

In outline, the fan track liner assembly of this embodiment comprises a plurality of tangs 40 which are fixed in an even spacing to the hook 31 of the containment fence of the fan case 60 by fixings (e.g. bolts) passing through a plurality of attachment holes 41. The tangs 40 have a base portion 42 in which the attachment holes 41 are located and an arm member 43 with an elongate profile and taper to a tip at the rearward end.

A plurality of fan track liner panels 50 are attached to the tangs 40 as described below. The panels 50 have filled honeycomb or co-moulded edges 51, such as co-moulded Lytex edges, with groove features 52 that engage with the tangs 40 around the leading edge and sides of the suspended liner portion, with each tang 40 bridging the gap between adjacent panels 50 as shown in FIG. 5*b*.

The panel 50 is of a honeycomb construction with an abradable layer (e.g. filled honeycomb structure) forming a layer on the interior surface of the panel. A carbon fibre septum 53 is provided Optionally the tangs could be in the form of a wave profile that takes up any tolerance between tang 40 and groove 52 as shown in the lower profile in FIG. 5*c*.

The tangs 40 are tapered in profile as shown in FIG. 5*c* with a leading edge radius to ease the assembly of each panel 50 onto the tangs 40. There is a further reason for this tapering as the required benefit is most needed at the tip of the trapdoor and least needed nearest the mid-span support hook. It is preferential to use separate metallic or composite tangs rather than cut complimentary tongue and groove features into the panel edges as the separate tangs can be stronger and can therefore be thinner leaving more material on the panel edges for greater integrity. The panels can all be the same standard and straight edged whereas tongue and groove panels will have A and B standards to provide slightly non axial interfaces for ease of assembly.

Indeed, it will be noted that the panels of this embodiment are identical, and therefore, compared to the existing solution discussed above, the panel skew has been removed. The panel skew is not required if the panels can be effectively inter-locked and the reduced length of the suspended front portion will also help to raise the panel frequency.

The present embodiment also provides an inter-locking solution to the fan track liner assembly that does not require gluing together. This can avoid assembly and repair in service issues. It can also allow the panels to move together as the tip of a released blade acts on them in a circumferential direction that also migrates forwards towards the containment case fence that will ultimately restrain axial motion of the released fragment provided the panels are depressed in a trapdoor fashion to expose the fence feature. Lastly this would further improve vibration (raise the frequency above red line speed blade passing induced excitation) by coupling the panels together.

Having removed the skew, assembly is straightforward and only a single panel standard is needed. With the associated rear acoustic panel 61 removed, the panel 50 forming the trapdoor cassette liner is loaded into a pair of tangs 40 from the rear and pushed forwards and eventually radially outwards having cleared the rear casing hook 33 to which the liner will be fastened as per the existing skewed trapdoor liner. The tangs 40 are radially flexible enough to allow this loading motion. Adjacent panels will require their fasteners to be missing to facilitate this by allowing the adjacent panels to sag away from the casing to facilitate assembly of the last panel. The panels can then all be fastened in place and the rear acoustic panels 61 assembled. No adhesive is required but foam spacers and filler can be applied to the gaps to produce a flush aerodynamic surface in line with current practice with the tangs 40 acting as a backstop over the forward suspended portion to avoid excessive filler.

The solution proposed in this embodiment should be just as effective for part speed part fragment blade failures as for full FBO events.

Figure 6A:
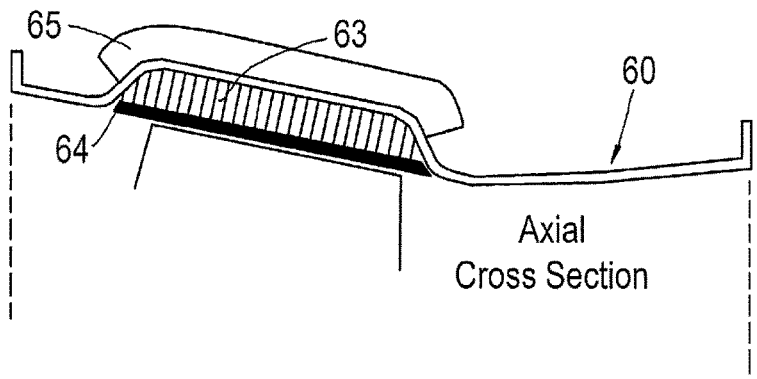
FIGS. 6a-6c show a fan track liner assembly and assembled fan track liner according to a further embodiment of the present invention.
Figure 6B:
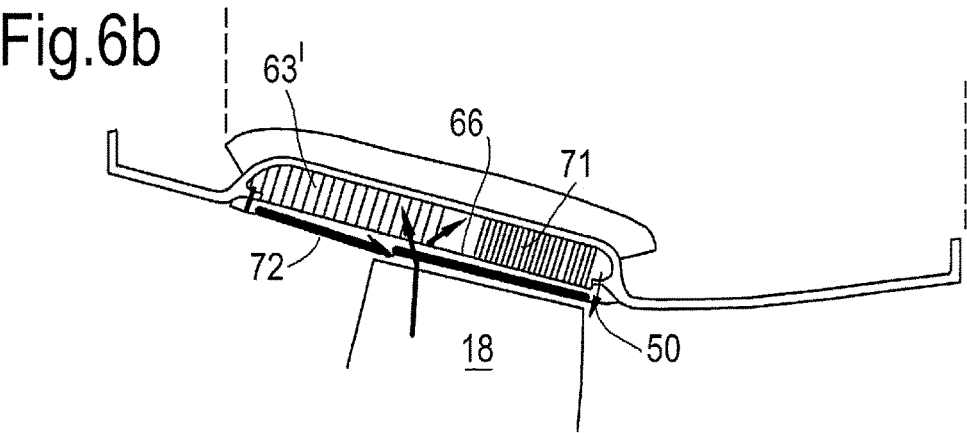
Figure 6C:
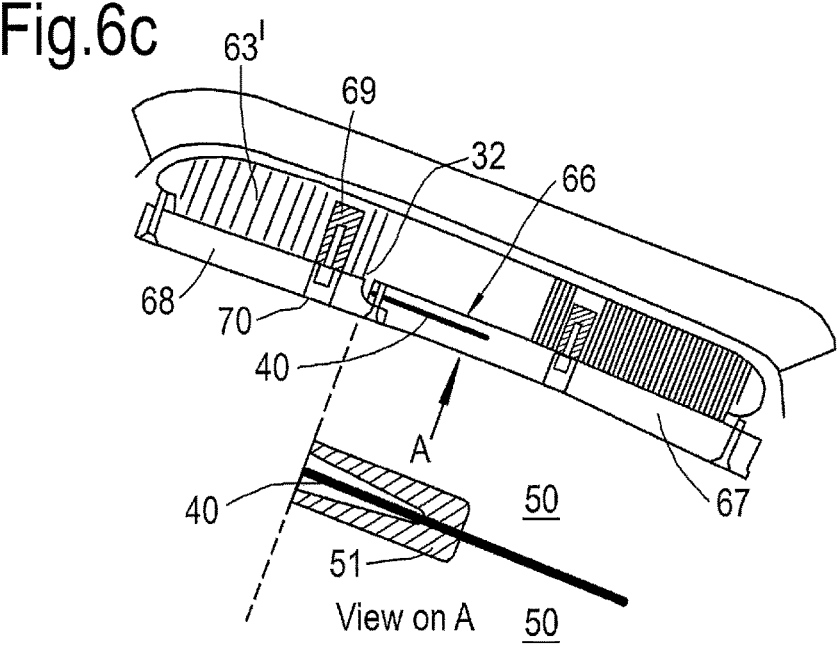

A fan track liner assembly according to a second embodiment of the present invention is shown in FIGS. 6*b*-6*c*. FIG. 6*a* shows the fan track liner of the prior art for comparison purposes.

In the soft wall fan case containment system of the prior art, a honeycomb "posting chamber" 63 is provided within the interior of the fan case 60 around the fan track liner separated from the interior of the fan case by a liner 64. In an FBO event, the blade 18 breaks through the liner 64 and is absorbed into the posting chamber 63. A Kevlar wrap 65 ensures containment in a "soft-wall" fashion.

FIGS. 6*b* and 6*c* show the arrangement of a fan track liner assembly within the engine casing as an adaption of the soft-wall containment system of FIG. 6*a*. FIG. 6*b* shows the schematic operation of this fan track liner in an FBO event. FIG. 6*c* shows further detail of the assembly of the fan track liner to the fan case 60.

Firstly the liner or posting chamber 63' has been extended forward to provide enough room for a substantial blade fragment to be absorbed. This has the benefit of allowing the trapdoor liner to be assembled in two parts.

Firstly the fan track liner panel 50 which comprises a trapdoor 66 and rear liner 67 are bolted in place then access is afforded from the front to slide in place individual tangs 40 between each panel 50 over the trapdoor portion. These tangs are as described in the above first embodiment. The edging 51 of the panels 50 are also as described in the above first embodiment.

The tangs 40 are received into grooves (not shown) cut in filled honeycomb panel edges (or co-moulded inserts, such as co-moulded Lytex inserts) 51. Then the front liner panels 68 are bolted in place to complete the liner system and the front of the trapdoor is attached to it with flush headed screws to complete the annulus line.

Fasteners that coincide with the fan blade tip rub path must be embedded into the liner structure and capped with filler 70 so as not to come into contact with blade tips during running other than when a blade is released. The forward extension of the posting chamber 63' allows the trapdoor leading edge screws to remain clear of the blade tips.

The bonded liner system beneath contains inserts 69, such as Lytex inserts, bonded in place with foaming adhesive to distribute loads into the honeycomb structure. These inserts receive fasteners that retain the removable liner panels. Otherwise the fan case barrel 60 provides attachment lugs at each end of the posting chamber 63'. The inserts are preferable to providing internal hooks as part of the casing which could obstruct the fragment posting, add cost and could interfere with post FBO rotor orbit and run down torque that could risk turbine shaft failure.

In this architecture only the exposed part of the liner system is detachable for in-service replacement in lieu of repair. There are a number of front and rear panels in the circumferential direction required to complete the annulus definition and facilitate practical assembly. Foam wedges and filler can be used to make interfaces aerodynamically smooth as current practice. The tangs 40 provide a backstop over the suspended portion to contain the filler which could fill the void behind and hinder trapdoor operation.

The basic principle of the trap door 66 is unchanged but, as shown in FIG. 6*b*, when it opens in response to pressure applied by a released blade fragment there is no containment fence exposed to retain the fragment axially; instead the fragment can pass into weaker honeycomb material 63' as it travels forwards and outwards, eventually being retained by the front wall of the posting chamber. If the fragment is sufficiently big and released at high speed the soft wall function in the form of a Kevlar wave arrests the fragment.

The rear portion of the fan track liner 71 has a high density honeycomb structure. This provides resistance against ice impact from ice being shed from the fan blades. The surface of the forward and rear liners facing the interior of the fan casing has an abradable outer layer 72, for example a filled honeycomb structure as in the first embodiment discussed above.

Further embodiments of the present invention apply the same principles to other casing architectures. For example, where significant fan operability challenges exist, slots can be deployed over the fan tips. The slots allow fan tip flow into a chamber behind the casing before re-joining the main flow with the effect of smoothing flow distortion. The bar features between the axially skewed slots can be composite for vibration integrity and therefore can be penetrated by a released blade portion. In such an application there is a potential to use these aerodynamic features to provide for posting blade fragments into the chamber behind.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An assembly for a fan track liner in a ducted fan engine, the assembly including:
   a plurality of panels; and
   a plurality of fastening members which are arranged to secure the panels to a fan case of the engine, wherein:
   each fastening member has a base portion and an elongate arm member, and further wherein:
      the base portion has attachment holes used to secure the fastening member to the fan case; and
      the arm member extends from the base portion, and
   each panel has slotted edge portions on opposing edges at one end of the panel which are each arranged to engage with respective arm members of fastening members on either side of the panel when the panel is assembled with the fastening members by sliding the panel onto the fastening members or vice-versa.

2. An assembly according to claim 1 wherein the area of the panel surrounding the slotted edge portions is formed from a filled honeycomb structure or from a co-moulded structure.

3. An assembly according to claim 1 wherein the arm members taper to a point at an end distal from the base portion.

4. An assembly according to claim 1 wherein the arm members have a wavy cross-section.

5. An assembly according to claim 1 wherein the panel has an engagement portion and a body portion, wherein the engagement portion includes said slotted edge portions, and further wherein at least the body portion has an abradable layer on one side and a honeycomb construction.

6. An assembly according to claim 1 wherein the panel has a hinged portion which operates as a trapdoor to permit a blade or blade fragment to pass through it.

7. A method of assembling a fan track liner in a gas turbine engine, the fan track liner including an assembly according to claim 6, the method including the steps of:
   attaching said panels into place circumferentially around the interior of the fan case;
   positioning said fastening members by inserting the arm member of each fastening member into the groove formed by the slotted edge portions of adjacent panels; and
   attaching said fastening members to said fan case.

8. A method according to claim 7 wherein the method further includes the step of attaching further panels to the interior of the fan case forward of said fastening members.

9. A gas turbine engine having a fan track liner which is formed of an assembly according to claim 1.

10. A gas turbine engine according to claim 9 wherein the panels of the assembled fan track liner abut around the inner circumference of the fan case of the engine.

11. A gas turbine engine according to claim 9 wherein the panel has a hinged portion which operates as a trapdoor to permit a blade or blade fragment to pass through it, and a portion of the fan track liner forward of said trapdoor has a honeycomb construction separated from the interior of the engine by a removable liner.

12. A gas turbine engine according to claim 11 wherein a portion of the fan track liner rearward of said trapdoor has honeycomb construction separated from the interior of the engine by said panel.

13. A gas turbine engine according to claim 12 wherein the rearward honeycomb construction is of a higher density than the forward honeycomb construction.

14. A method of assembling a fan track liner in a gas turbine engine, the fan track liner including an assembly according to claim 1, the method including the steps of:
   attaching the plurality of fastening members to the fan case of the engine at positions equidistant around the circumference of the interior of the fan case; and
   sliding the plurality of panels onto the plurality of fastening members, the plurality of panels collectively making up the interior surface of the fan track liner.

* * * * *